United States Patent [19]
Levasseur

[11] Patent Number: 5,564,517
[45] Date of Patent: Oct. 15, 1996

[54] SNOWMOBILE CONVERSION FRAME KIT

[76] Inventor: Gary R. Levasseur, 241 Groton Rd., Westford, Mass. 01886

[21] Appl. No.: 304,116

[22] Filed: Sep. 12, 1994

[51] Int. Cl.$^6$ .......................... B62D 61/06; B62B 19/04; B62M 27/02
[52] U.S. Cl. .................. 180/185; 180/183; 180/210; 180/9.3; 180/186; 280/756; 280/495
[58] Field of Search ........................ 180/183, 184, 180/185, 210, 215, 9.1, 9.26, 9.28, 9.3, 251, 233, 186; 280/756, 495, 496

[56] References Cited

U.S. PATENT DOCUMENTS

| | | | |
|---|---|---|---|
| 2,889,155 | 6/1959 | Sandage | 280/495 X |
| 3,521,717 | 7/1970 | Coons | 180/185 |
| 3,649,040 | 3/1972 | Snider, Jr. | 180/183 X |
| 3,664,447 | 5/1972 | Kane | 180/185 |
| 3,704,031 | 11/1972 | Confer | 280/756 |
| 3,774,706 | 11/1973 | Keikhaefer | 180/185 |
| 4,082,155 | 4/1978 | McCartney | 180/185 |
| 4,135,591 | 1/1979 | Eberle | 280/756 X |
| 4,195,702 | 4/1980 | Denis | 180/183 |
| 4,204,582 | 5/1980 | Van Soest | 180/183 |
| 4,798,399 | 1/1989 | Cameron | 280/756 |
| 5,427,396 | 6/1995 | Gore | 280/756 X |
| 5,441,294 | 8/1995 | Losier | 280/495 X |

*Primary Examiner*—Anne Marie Boehler
*Assistant Examiner*—F. Zeender

[57] ABSTRACT

A snowmobile conversion frame kit including a frame member arranged for securement to a roll bar, that in turn is secured to an associated snowmobile, such that the frame member includes a steering assembly at its forwardmost end and the steering assembly includes a wheel member at each end of the steering assembly, with each wheel member having a brake system secured thereto, with a swing arm pivotally mounted to a rearwardmost end of the frame member, with the swing arm assembly having an axle mounting a tire member thereto, and a sprocket secured to the axle, such that upon power directed to the sprocket rotation of the rear wheel member is effected effecting motivation of the thusly converted snowmobile, wherein towing of the snowmobile is permitted by employing a coupling assembly arranged for grasping and securing the swing arm assembly, with the tow bar assembly having a coupling for securement to a tow vehicle.

5 Claims, 4 Drawing Sheets

5,564,517

SNOWMOBILE CONVERSION FRAME KIT

TECHNICAL FIELD

The field of invention relates to snowmobile and associated structure, and more particularly to a new and improved snowmobile conversion frame kit permitting the conversion of a snowmobile relative to a snow-traversing vehicle to a ground-engaging vehicle.

BACKGROUND OF THE INVENTION

U.S. Pat. Nos. 4,662,468 and 3,521,717 are examples of prior art ground traversing snowmobiles converted thereto, with U.S. Pat. Nos. 3,570,617 and 3,696,877 further examples of snowmobiles arranged to permit overland travel.

The instant invention attempts to overcome deficiencies of the prior art by providing for a snowmobile conversion kit such that the adaptability and relative ease of converting a snowmobile to a ground-engaging vehicle employing steering and drive wheel structure is availed in a manner to permit ease of such conversion not contemplated by the prior art.

SUMMARY OF THE INVENTION

The present invention relates to snowmobile conversion kits, such that a frame member includes a rear swing arm member, such that the swing arm member includes a drive wheel, with the frame member having front steering wheels including hydraulic brake drum assemblies associated with each one of the wheels, and the frame arranged for ease of mounting to an existing snowmobile.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

Figure 1:
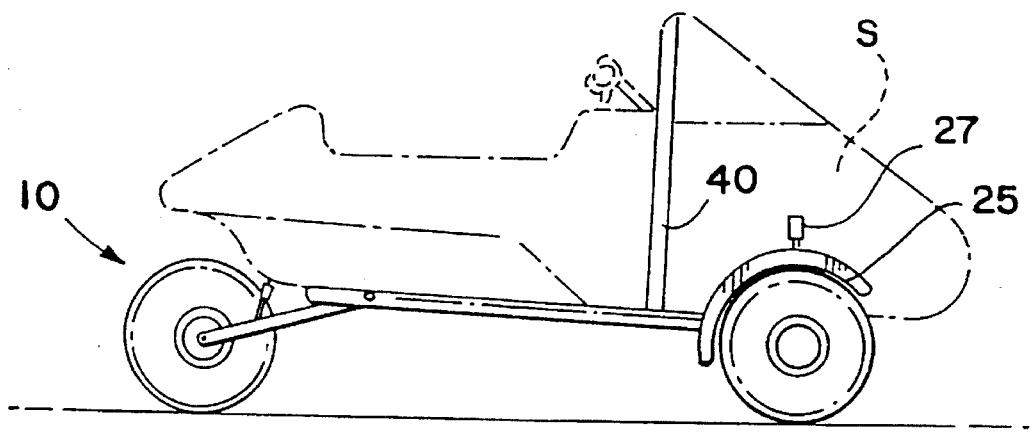
FIG. 1 is an orthographic side view of the invention mounted to an existing snowmobile.

As required, detailed embodiments of the present invention are disclosed herein; however, it is to be understood that the disclosed embodiments are merely exemplary of the invention, which may be embodied in various forms. therefore, specific structural and functional details disclosed herein are not to be interpreted as limiting, but merely as a basis for the claims and as a representative basis for teaching one skilled in the art to variously employ the present invention in virtually any appropriately detailed structure.

The snowmobile conversion frame kit of the invention includes a frame member 11 having spaced first and second side legs 12 and 13 extending to a connecting leg 14 that mounts a central steering member 17 of a steering assembly 11a. The central steering member 17 has at its first and second ends threadedly secured thereto respective first and second steering members 15 and 16, that in turn are rotatably mounted to first and second wheel members by way of first and second drum assemblies 18a and 19a respectively of the wheel members 18 and 19 respectively. The drum assemblies are typical hydraulic drum structure, but any such hydraulically motivated, mechanically motivated brake pad and drum assembly may be employed, as well as various disc brake and rotor assemblies that are arranged to rotatably mount wheel members. First and second hydraulic conduits 21 and 22 extend to the respective first and second brake member assemblies 18a and 19a respectively. A steering connecting flange 20 is mounted to the central steering member 17, with the steering connector flange 20 pivotally mounted to the connecting leg 14, such that an existing steering assembly of an existing snowmobile is arranged for securement and reception through the steering connector flange 20, such that upon its displacement steering is effected by displacement of the central steering member 17 relative to the connecting leg 14.

Figure 2:
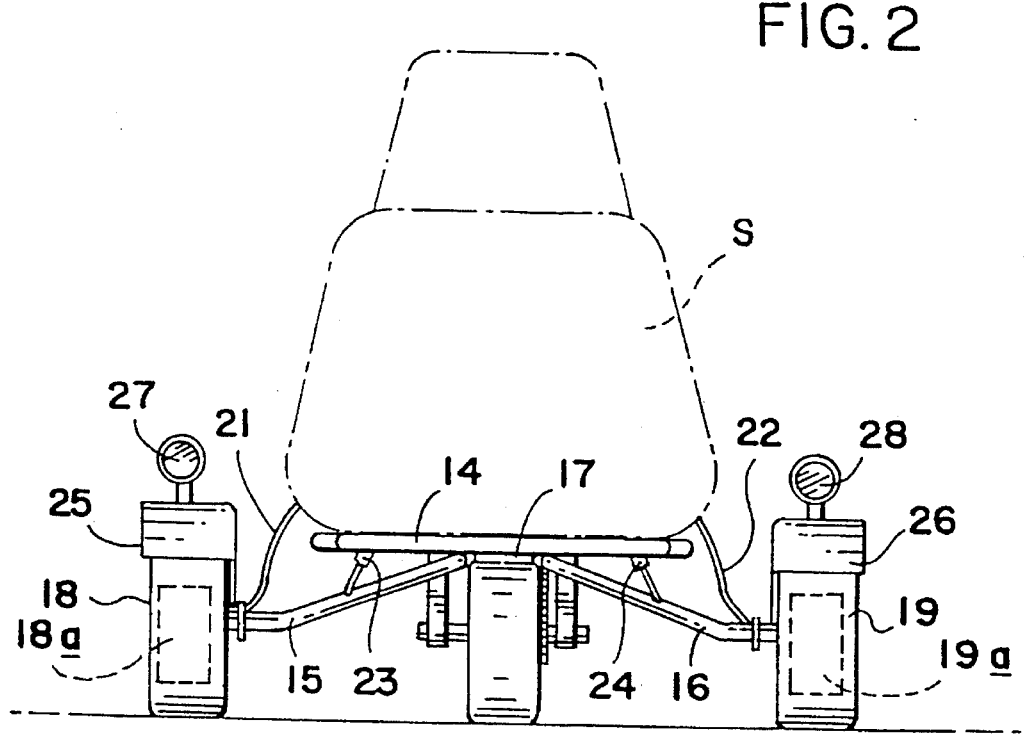
FIG. 2 is an orthographic front view, taken in elevation, of the invention mounted to an existing snowmobile.

First and second respective shock absorbers 23 and 24 are secured respectively to the first and second steering members 15 and 16 and to the connecting leg 14, such as illustrated in FIG. 2 for example. The shock absorbers may be of any fluid dampening construction as desired.

First and second fenders 25 and 26 may be secured as illustrated to the respective first and second steering members 15 and 16 and in turn, the first and second fenders mounting first and second turn signal lamps 27 and 28 for subsequent electrical association with an indicator structure (not shown) for use in providing for a street legal device.

Figure 3:
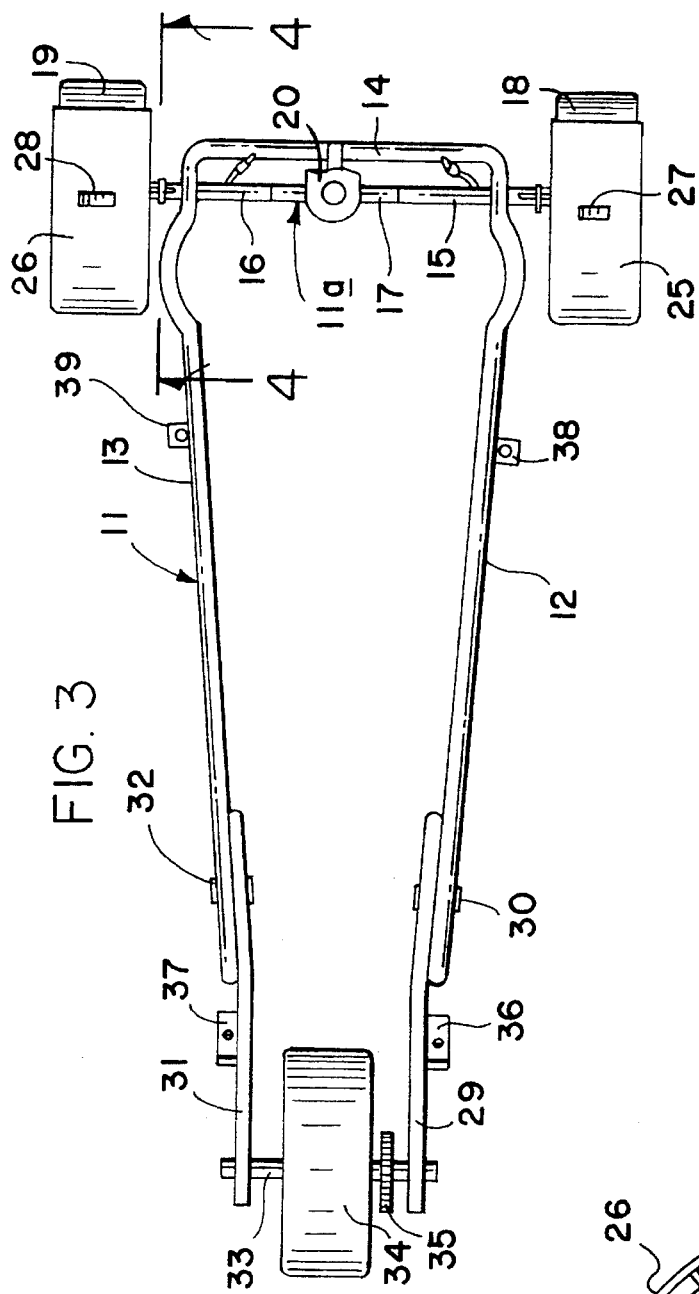
FIG. 3 is an orthographic top view of the frame assembly of the invention.
Figure 4:
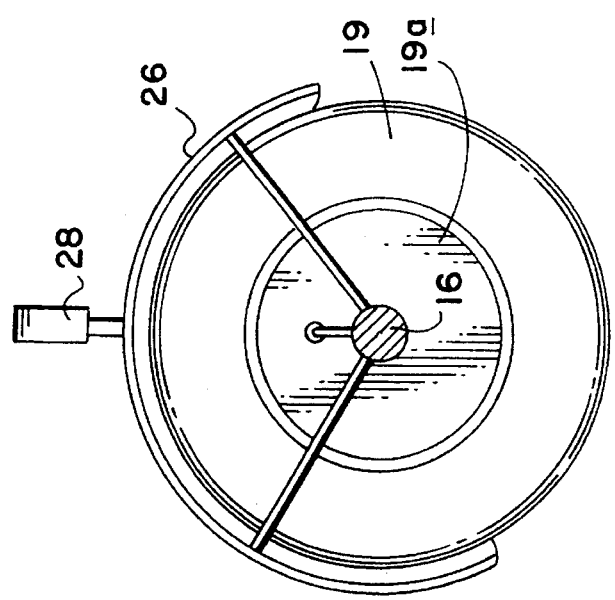
FIG. 4 is an orthographic view, taken along the lines 4—4 of FIG. 3 in the direction indicated by the arrows.

With respective to FIG. 3 for example, a swing arm assembly employs respective first and second spaced swing arm tubes 29 and 31 having respective first and second pivot axles 30 and 32 secured adjacent rearwardmost distal ends of the respective first and second side legs 12 and 13. A rear axle 33 orthogonally directed through the first and second swing arm tubes 29 and 31 is arranged such that the rear axle 33 rotatably mounts a rear wheel 34, with the axle 33 motivated by a sprocket 35. The sprocket 35 is available and fixedly secured to the axle 33 arranged for securement to an output (not shown) of the snowmobile "S", such that rotation of the axle 33 and the wheel 34 secured thereto is arranged to effect motivation of the vehicle as assembled, as indicated in FIGS. 1 and 2. The rear axle 33 may be mounted in bearings and the like rotatably through the respective first and second swing arm tubes 29 and 31. Further, first and second rear shock mounting flanges 36 and 37 are provided fixedly secured to respective first and second swing arm tubes for subsequent securement to the snowmobile "S" if so desired, as illustrated in FIG. 1.

Figure 6:
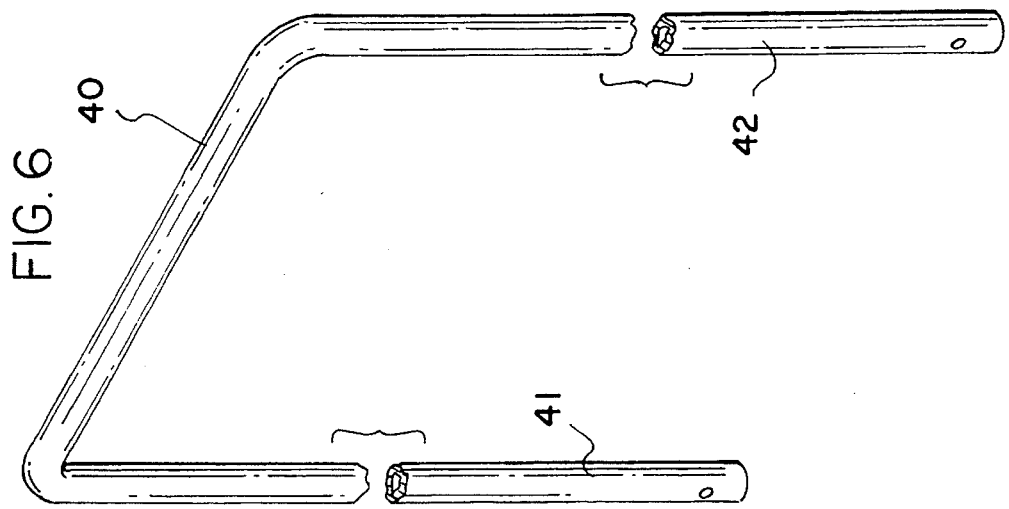
FIG. 6 is an isometric illustration of a roll bar structure arranged for use in cooperation with an existing snowmobile.
Figure 5:
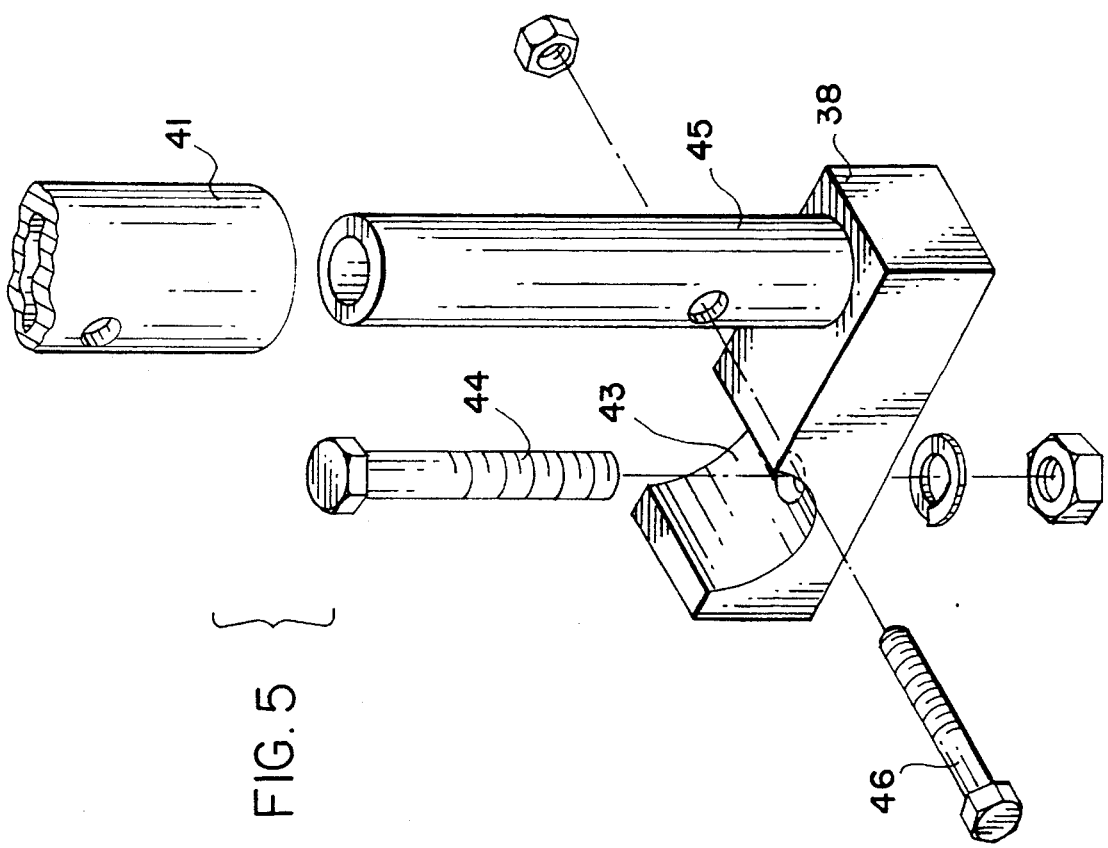
FIG. 5 is an enlarged isometric view in exploded illustration of the roll bar structure of the existing snowmobile arranged for securement to one of a plurality of roll bar frame connectors.

First and second roll bar frame connectors 38 and 39 are secured to respective first and second side legs 12 and 13, with each of these frame connectors 38 and 39 illustrated in FIG. 5 in a mirror image relationship extending from the first and second side legs 12 and 13 for securement to a roll bar 40 that is arranged for fixed securement to the snowmobile extending through the snowmobile and subsequently secured to the first and second roll bar frame connectors 38 and 39. The manner of securing the roll bar 40, such as illustrated in FIG. 6, is discretionary and dependent upon the configuration of an associated snowmobile to be employed.

Specifically, the roll bar 40 having respective first and second roll bar legs 41 and 42 are arranged for securement to respective first and second roll bar frame connectors 38 and 39. Each of the frame connectors includes a top wall having an arcuate recess 43 arranged to receive an associated frame side leg either 12 or 13, such that a first fastener 44 is directed through the associated frame 11 into the frame connector, as illustrated in FIG. 5. The top wall includes a receiving tube 45 fixedly secured thereto to receive a respective leg of the roll bar 40, such that a receiving tube fastener 46 directed through the receiving tube as well as the roll bar fixedly secures the roll bar to the frame connector and as the roll bar is to be secured fixedly to the associated snowmobile, the snowmobile is arranged in a secured assembly fixedly secured to the frame 11.

Figure 7:
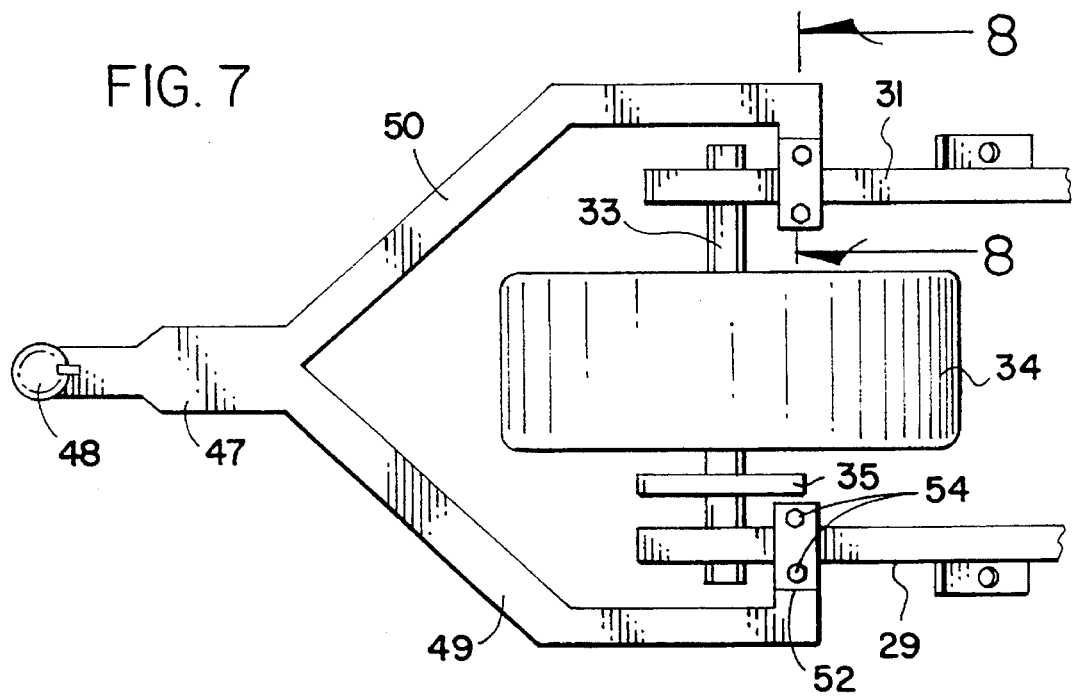
FIG. 7 is an orthographic top view of a tow bar structure arranged for use by the frame assembly, as indicated in FIG. 3.
Figure 8:
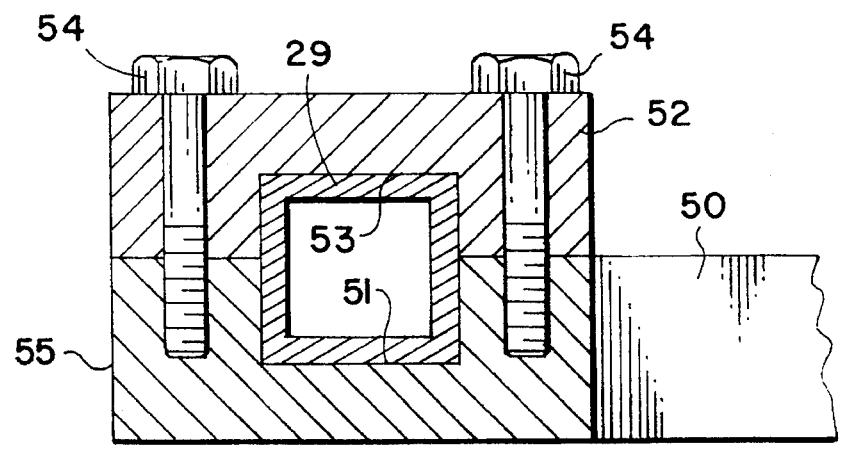
FIG. 8 is an orthographic view, taken along the lines 8—8 of FIG. 7 in the direction indicated by the arrows.

Reference to the FIGS. 7 and 8 indicates the further use by the kit structure of the invention of a tow bar assembly having a tow bar frame 47 terminating in a coupler member 48 at its free end for receiving a conventional towing ball such as is conventionally mounted to an associated tow vehicle (not shown). First and second tow bar legs 49 and 50 extend from the tow bar frame 47, each terminating in a leg coupling boss 55 such as illustrated in FIG. 8, with each coupling boss having a coupling recess 51 arranged to receive a respective swing arm tube. A clamp bar 52 secures the swing arm tube between the clamp bar, and more specifically a clamp bar recess 53, such that a plurality of clamp bar fasteners 54 directed through the clamp bar 52 are received within the leg coupling boss 55 to thereby secure the swing arm tube therein and may therefore permit towing of the vehicle. It may be desired to lock the first and second wheels relative to turning during a towing procedure.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by LETTERS PATENT of the United States is as follows:

1. A snowmobile conversion frame kit comprising:

a frame member having a first side leg spaced from a second side leg, with the first side leg having a first leg forward end and the second side leg having a second leg forward end, with a connecting leg extending between the first leg forward end and the second leg forward end; and a steering assembly pivotally mounted to the connecting leg, with the steering assembly having a central steering member, the central steering member having a central member first end spaced from a central member second end, a first steering member secured to the central first end, and a second steering member secured to the central member second end, with the first steering member having a first wheel secured thereto, and the second steering member having a second wheel secured thereto; and a swing arm assembly secured to the frame member first side leg and the frame member second side leg at a position spaced from the connecting leg, with the swing arm assembly having a rear axle, the rear axle having a rear wheel rotatably secured thereto, and a sprocket fixedly secured to the rear axle; and a tow bar assembly, the tow bar assembly having a tow bar frame free end terminating in a coupling member, and the tow bar frame having a first tow leg and a second tow leg, said first and second tow legs being arranged for securement to the swing arm assembly; and the first side leg and the second side leg of the frame member each include a frame connector fixedly secured thereto, with each said frame connector having a receiving member, and a roll bar, the roll bar having a plurality of roll bar legs, and said receiving member of each said frame connector having securement means for selective securement of each receiving member to one of said roll bar legs.

2. A kit as set forth in claim 1 wherein the swing arm assembly further includes a first swing arm tube spaced from a second swing arm tube, the first swing arm tube having a first tube pivot axle pivotally mounting the first swing arm tube to the first side leg, and the second swing arm tube having a second tube axle pivotally mounting the second swing arm tube to the second side leg.

3. A kit as set forth in claim 1 wherein the first wheel has a first fender positioned thereover and the second wheel has a second fender positioned thereover, with the first fender having a first signal lamp and the second fender having a second signal lamp secured thereto.

4. A snowmobile conversion frame kit, comprising:

a frame member having a first side leg spaced from a second side leg, with the first side leg having a first leg forward end and the second side leg having a second leg forward end, with a connecting leg extending between the first leg forward end and the second leg forward end; and a steering assembly pivotally mounted to the connecting leg, with the steering assembly having a central steering member, the central steering member having a central member first end spaced from a central member second end, a first steering member secured to the central member first end, and a second steering member secured to the central member second end, with the first steering member having a first wheel rotatably secured thereto, and the second steering member having a second wheel rotatably secured thereto; and wherein the first wheel has a first fender positioned thereover and the second wheel has a second fender positioned thereover, with the first fender having a first signal lamp and the second fender having a second signal lamp secured thereto and a swing arm assembly secured to the frame member first side leg and the frame member second side leg at a position spaced from the connecting leg, with the swing arm assembly having a rear axle, the rear axle having a rear wheel rotatably secured thereto, and a sprocket fixedly secured to the rear axle; and wherein the swing arm assembly includes a first swing arm tube spaced from a second swing arm tube, the first swing arm tube having a first tube pivot axle pivotally mounting the first swing arm tube to the first side leg, and the second swing arm tube having a second tube axle pivotally mounting the second swing arm tube to the second side leg and the first side leg and the second side leg of the frame member each include a frame connector fixedly secured thereto, with each said frame connector having a connector top wall, with the connector top wall having a recess to receive the frame member, and a first fastener secured through the frame member and through the recess to secure each said frame connector to the frame member, and a receiving tube fixedly secured to the frame connector top wall, and a roll bar, the roll bar having a plurality of roll bar legs, and one of said roll bar legs arranged to receive said receiving tube of each frame connector therewithin, with said receiving tube having a receiving tube fastener to secure the receiving tube to the roll bar.

5. A snowmobile conversion frame kit, comprising:

a frame member having a first side leg spaced from a second side leg, with the first side leg having a first leg forward end and the second side leg having a second leg forward end, with a connecting leg extending between the first leg forward end and the second leg forward end; and a steering assembly pivotally mounted to the connecting leg, with the steering assembly having a central steering member, the central steering member having a central member first end spaced from a central member second end, a first steering member secured to the central member first end, and a second steering member secured to the central member second end, with first steering member having a first wheel rotatably secured thereto, and the second steering member having a second wheel rotatably secured thereto; and wherein the first wheel has a first fender positioned thereover and the second wheel has a second fender positioned thereover, with the first fender having a first signal lamp and the second fender having a second signal lamp secured thereto and a swing arm assembly secured to the frame member first side leg and the frame member second side leg at a position spaced from the connecting leg, with the swing arm assembly having a rear axle, the rear axle having a rear wheel rotatably secured thereto, and a sprocket fixedly secured to the rear axle; and wherein the swing arm assembly includes a first swing arm tube spaced from a second swing arm tube, the first swing arm tube having a first tube pivot axle pivotally mounting the first swing arm tube to the first side leg, and the second swing arm tube having a second tube axle pivotally mounting the second swing arm tube to the second side leg and a tow bar assembly, the tow bar assembly having a tow bar frame having a tow bar frame free end terminating in a coupling member, and the tow bar frame having a first tow leg and a second tow leg, said first and second tow legs being arranged for securement to the swing arm assembly, with each said first tow leg and second tow leg terminating in a leg coupler boss, with each leg coupler boss including a coupling recess, and a clamp bar having a clamp bar recess arranged in a facing relationship to said coupling recess, with at least one clamp bar fastener arranged to secure the clamp bar to the leg coupler boss.

* * * * *